Oct. 21, 1958 L. D. ETHERINGTON ET AL 2,857,352
PROCESS FOR THE PRODUCTION OF POLYETHYLENE-WAX BLENDS
Filed May 15, 1953
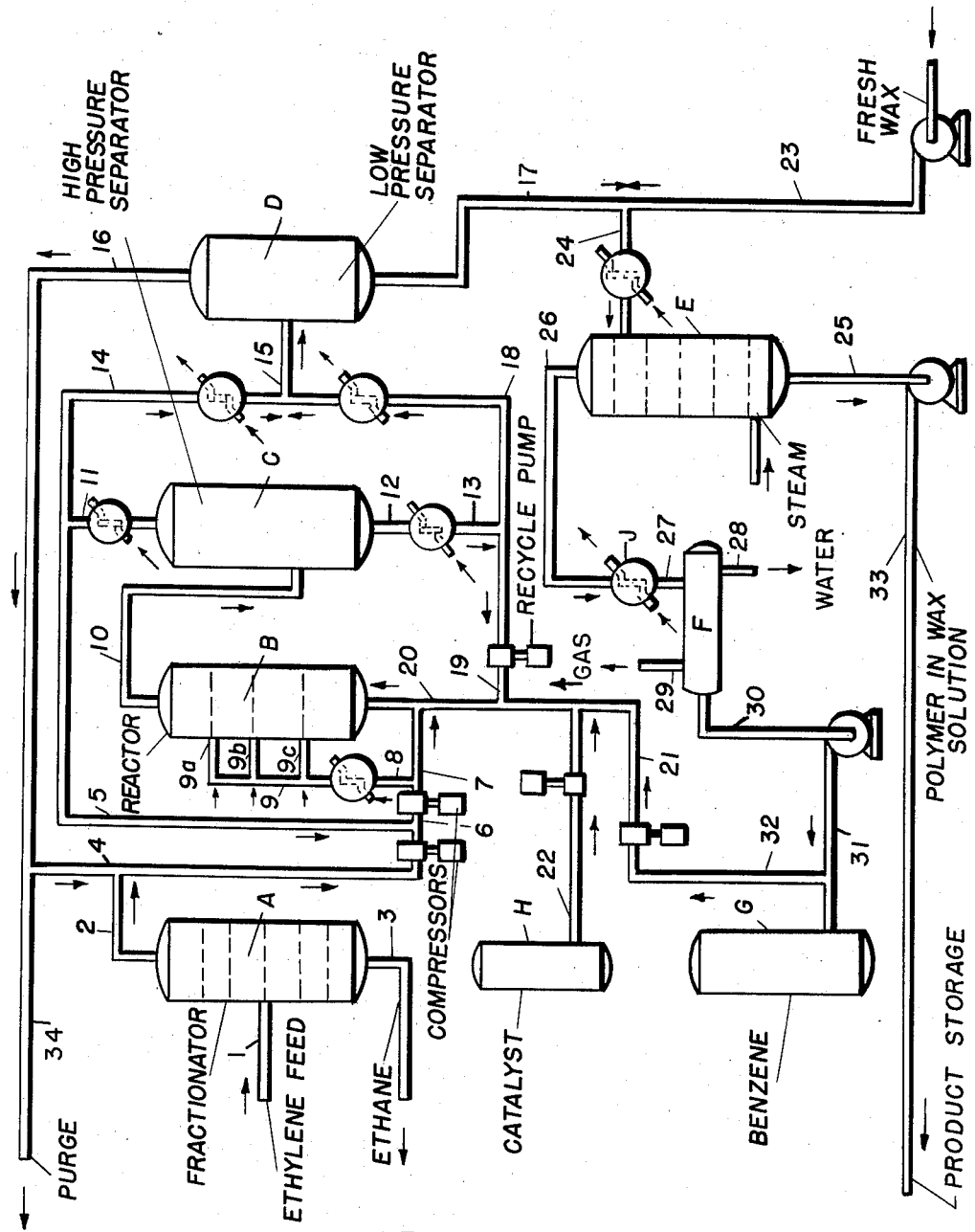
LEWIS D. ETHERINGTON
RAYMOND G. NEWBERG
HOWARD L. WILSON
ANDREW F. SAYKO
INVENTORS
BY *W. H. Smyers* ATTORNEY

United States Patent Office 2,857,352
Patented Oct. 21, 1958

2,857,352

PROCESS FOR THE PRODUCTION OF POLYETHYLENE-WAX BLENDS

Lewis D. Etherington, Cranford, Raymond G. Newberg, Roselle Park, Howard L. Wilson, Raritan Township, Middlesex County, and Andrew F. Sayko, Westfield, N. J., assignors to Esso Research and Engineering Company, a corporation of Delaware Application May 15, 1953, Serial No. 355,334

4 Claims. (Cl. 260—28.5)

This invention relates to a novel process for polymerization of ethylene, and to the production of improved wax compositions by incorporation of the ethylene products in waxes such as paraffin waxes.

It is known that liquid to solid polymers may be prepared by heating ethylene at controlled temperatures above the decomposition temperature of initiating catalysts which decompose to free radicals such as peroxides, hydroperoxides, oxygen, etc. The reaction is usually carried out at super-atmospheric pressures, generally above 50 atmospheres, employing reaction media of either the aqueous or organic types. In other cases, the polymers of ethylene may be prepared by mass polymerization in the absence of other reaction media.

It is further known that the incorporation of certain of these polyethylene polymers into paraffin or petroleum waxes imparts much improved properties to the waxes so modified. This is generally done by mechanical mixing of the molten petroleum wax with the extremely viscous polyethylene. The high molecular weight ethylene polymers dissolve with great difficulty in molten petroleum waxes.

Although it is quite desirable to use wax as the ethylene polymerization medium, it has been found that polyethylene polymers produced in benzene media are, at least for some purposes, superior to polyethylene polymers prepared in other ways.

It has, therefore, been found that the optimum conditions can be employed in a process in which the desired polyethylene polymer is produced in a benzene medium, thereafter the benzene is removed substantially completely from the polymer and, simultaneously, the wax-polymer product is made up.

During separation of the residual benzene from the polymer, it is desirable that another polymer solvent, preferably the molten wax, be present in the mixture during the separation. Otherwise, the benzene stripping operation would entail handling substantially pure polymer which, even in the molten state, is quite sticky and almost impossible to handle continuously. Wax should preferably be added prior to stripping the product free of benzene. Thus, in completing the steam stripping of the benzene from the polymer product, the wax present would remain with the polymer, serve to dilute the polymer, and lower its viscosity for easier handling, and also serve as the final solvent for the polymer concentrate product.

Thus, the ethylene polymerization is carried out with substantially pure benzene as the reaction medium. After flashing excess unreacted ethylene from the benzene-polymer solution, molten wax is then added to this solution just prior to the benzene-polymer separation step. Thus, large quantities of wax are not present in the reactor itself to affect adversely the polymer quality, or to undergo degradation by possible reaction with ethylene and catalyst, but it is available to serve as a diluent and product solvent during later steps.

The advantages of this process include elimination of polymer recovery equipment, ease of solvent recovery, elimination of wax blending facilities, and ease of handling by marketers and consumers.

The polymerization of ethylene in the benzene media is initiated by organic and inorganic peroxides.

Ethylene feed purity may range between 45% and 99.9% depending on pressure and temperature of polymerization and preferably 65% at 3500 p. s. i. g. ethylene pressure.

Among the catalysts and initiators which can be employed in carrying out the process of this invention and which are commonly known as polymerization catalysts, there are included molecular oxygen and the per-oxygen or peroxide compounds both of the organic and inorganic classes such as lauroyl peroxide, ditertiary butyl peroxide, ammonium persulfate, sodium perborate, benzoyl peroxide, furyoyl peroxide, dicamphoryl peroxide, diethyl peroxide, dimethyl peroxide, tertiary butyl hydroperoxide, benzoperacid, furoperacid, camphor peracid, and acetoperacid; thermodecomposition products of organometallic compounds such as tetraethyl lead; nitrogen compounds including hydrazine, hydrozine hydrochloride, semi-carbazide hydrochloride, and alpha,alpha,alpha-trimethyl-hydrazinium iodide; perchloro compounds such as hexachloroethane and octachloropropane; and salts of aromatic sulfonamides such as the N-chloraryl sulfonamides, exemplified by chloramine-T and chloramine-B as well as hydrogen peroxide.

Although the amount of polymerization catalyst may vary somewhat depending on the particular catalyst used, it is generally employed in proportions of from 0.001% up to 5% of the total weight of monomers. The polymerization catalyst concentration is preferably included in the range of about 0.05% up to about 3% of the total reaction mixture.

The polymerization reaction media may be any liquid material which exerts a modifying action on the polymerization. Materials such as alcohols, ketones, aliphatic and aromatic hydrocarbons and the like can be used. It is preferred to employ aromatic hydrocarbons of 6 to 8 carbon atoms, benzene being particularly desirable as a reaction medium for production of high quality polyethylene.

The reaction temperature is controlled above the decomposition point of the particular peroxide used as the initiator. The temperature employed will generally be between 70 to 225° C. and preferably above 100° C. The ethylene pressure should be maintained at pressures of from 1500 to 30,000 p. s. i. g.

The petroleum waxes best adapted for use in the present invention are the crystalline, semi-crystalline, microcrystalline or paraffin waxes having melting points of from about 120° F. (48.9° C.) to about 165° F. (73.9° C.), and preferably from about 130° F. (54.4° C.) to about 145° F. (62.7° C.). Such waxes are of the type used for the coating or waxing of paper and are of the types most frequenty modified by addition of polyethylene.

The essential operating steps of the process consist of continuously introducing benzene into a reactor along with peroxide catalyst. Ethylene, including both fresh feed and recycle material, are added into the reactor. After suitable adjustment of the reactor size and stream rates to permit sufficient polymerization of the ethylene, the ethylene polymer-benzene mixture is allowed to flow out of the reactor unit continuously into at least one and preferably two depressurizing chambers. The unreacted ethylene is recycled back for further polymerization from the top of the depressurizing drum. Recovered benzene is also returned to the reactor system. From the final depressurizing drum, the ethylene polymer with the remaining benzene is contacted immediately with molten wax and the mixture is passed into a stripper to permit removal of the final amount of benzene and other volatiles in order to adjust the polymer-wax concentration to the desired level. Then the finished polymer-wax blend can be cast into blocks for storage shipment or it may be shipped molten in tank cars.

The vessel used in carrying out the polymerization must be fabricated of materials capable of withstanding the conditions of temperature and pressure employed for the polymerization. That portion of the equipment which comes into actual contact with the polymerization system should preferably be made from or lined with a material which does not corrode rapidly, or which will not affect the reactants. Suitable materials of construction as well as linings include glass, enamel, silver, aluminum, tin, stainless steels which contain 18–20% chromium and 8–14% nickel, nickel, and manganese alloys containing high proportions of nickel.

Clear solutions of the resulting new wax-polyethylene mixtures prepared by this novel method are obtained at temperature ranges between about 60 and 150° C., depending on the initial melting point of the wax and the concentration of the polymer in the wax, and are readily incorporated into paper or other fabric material by well-known trade methods. The polyethylene in wax mixtures so prepared will generally be found to contain from 0.25 up to 30% of the polymer and from 99.75 to 70% of paraffin wax.

These products are particularly useful as improved hydrocarbon waxes and are especially valuable for coating on or incorporation into paper, fabric, or other cellulosic material into which the wax-polymer blend is absorbed. When the coated paper is employed as a wrapper, the lapped edges are readily heat sealed into each other to give a seal of high strength. At the same time, the presence of the polyethylene destroys the tackiness of the paraffin surface and the tendency toward pressure flow of the paraffin, substantially raises the "blocking" temperature and does not produce mottled effects in the cold wax. The cloud points of these products compare favorably with those of the mechanically blended products.

The invention is illustrated by the following example but it is not intended to limit the invention thereto.

*Example*

A crude $C_2$ stream containing a substantial quantity of ethylene is passed via line 1 to fractionator A. The ethane, if any, is separated as a bottoms stream 3 along with other components which are higher boiling than ethylene. The fractionating tower A is operated under conditions such that substantially pure ethylene is separated as overhead stream 2. This purified ethylene is continuously passed by line 4, through suitable compressors, then via lines 6, 7, 8 and 9 to one or more inlet lines 9a, 9b and 9c and 20 into polymerization reactor B. Unreacted ethylene from the separators may, if desired, be recycled through lines 16 and 5 into line 4 and thence to reactor B. A cooler or condenser can be used in line 8. In reactor B, the compressed ethylene is contacted with peroxide catalyst introduced into the reactor from storage chamber H, through lines 22 and 20. Benzene, from storage G, is added to the reactor via lines 32, 21 and 20. The benzene functions as a polymerization modifier and as a carrier for the peroxide catalyst. The reactor contents are passed overhead continuously from the reactor through line 10 into the first depressurizing chamber C. The contents consist of a polyethylene together with unpolymerized ethylene, benzene, and residual catalyst. In the first depressurizing zone C the pressure is reduced sufficiently (to about 1500 p. s. i. g.) which causes the bulk of unreacted ethylene to be flashed off by line 11 and thence through lines 5, 6 and 8 back to reactor B. A part of the flashed ethylene may be passed by lines 14 and 15 into the second depressurizing drum D. The polyethylene, benzene and residual dissolved ethylene flow from separator C via lines 12, 13, 18 and 15 into the second depressurizing drum D. Some recycle liquid from chamber C may be returned to B by line 19. Any further unreacted ethylene flashed from the polymer-benzene solution in D is recycled through lines 16 and 4. Molten wax is added to the substantially ethylene-free polymer-benzene mixture by line 23 to the second pressure separator D, or to line 17, to achieve the desired concentration of polyethylene in wax. The pressure is also further reduced. The polyethylene-wax-benzene mixture passes from separator D by line 17 and 24 into stream stripper E. Line 24 may contain an orifice mixer and a heat exchanger in order to obtain a homogeneous polymer-benzene-wax solution, and to control the temperature or fluidity of this mixture. Stripper E is operated under conditions whereby the excess benzene is stripped out with steam, recycled as overhead stream 26 into condenser J, water-benzene-gas separator F, and thence by lines 30 and 31 back to the catalyst-benzene system for recharging to the reactor. The polymer in the wax product is passed from stripper E as bottoms stream 25 through line 33 to storage or sales. A portion of the unreacted ethylene flashed from solution in C and D may be purged via line 34 in order to control the concentrations of ethylene and gaseous impurities in the reactor which affect polymer quality. It may be desirable to treat the recycle benzene and ethylene streams, for example by adsorption or fractionation, to remove polymerization poisons formed in the reactor.

What is claimed is:

1. A process for the production of polyethylene-wax blends which comprises subjecting ethylene to polymerization at a temperature of about 70 to 225° C. and a pressure of 1500 to 30,000 p. s. i. g. in the presence of a reaction medium consisting essentially of benzene until polymerization is substantially complete, thereafter adding molten petroleum wax and substantially removing said benzene in the presence of said petroleum wax at a temperature of about 60 to 150° C.

2. A process for the preparation of polyethylene-wax blends which comprises continuously polymerizing an ethylene containing stream in the presence of a peroxide type catalyst and a reaction medium consisting essentially of benzene diluent at a temperature between 70 and 225° C. and a pressure of from 2000 to 30,000 p. s. i. g. until polymerization is substantially complete, thereafter stripping the major portion of the benzene from the polyethylene polymer, admixing a molten petroleum wax with the solution of polymer in the remaining benzene and thereafter substantially separating the residual benzene from the polyethylene-wax mixture at a temperature of about 60–150° C.

3. A process for the production of polyethylene-wax blends which comprises subjecting ethylene to polymerization at a temperature between 70 and 225° C. and pressure of 1500 to 30,000 p. s. i. g. in the presence of a reaction diluent consisting essentially of benzene and in the presence of a polymerization catalyst of the peroxide type until polymerization is substantially complete, thereafter adding molten petroleum wax to the polymer while still dissolved in at least a portion of said benzene and finally removing all benzene from the resulting benzene-polymer-wax solution at a temperature of about 60–150° C. to leave only a polymer-wax blend containing about 0.25 to 30% of polymer.

4. A process for the preparation of an improved polyethylene-petroleum wax blend which comprises polymerizing ethylene at a temperature level of between about 70° to 225° C. and a pressure of between about 1,500 and 30,000 p. s. i. g. in the presence of a peroxide catalyst and a reaction medium consisting essentially of benzene until polymerization is substantially complete, thereafter removing unreacted ethylene from the resulting solution of polyethylene, thereafter adding about 70% to about 99.75%, based on polyethylene plus wax blend, of molten petroleum wax to the polyethylene while it is dissolved in the solvent, and removing substantially all of the benzene from the resulting mixture at a temperature of about 60–150° C. to form a substantially clear solution of polyethylene in molten wax.

References Cited in the file of this patent

UNITED STATES PATENTS

| | | |
|---|---|---|
| 2,497,323 | Roedel | Feb. 14, 1950 |
| 2,523,705 | Lovell et al. | Sept. 26, 1950 |
| 2,559,645 | Larsen et al. | July 10, 1951 |
| 2,706,719 | Newberg et al. | Apr. 19, 1955 |